March 25, 1930.    H. W. NIEMAN    1,751,648
SERVO MECHANISM
Original Filed Jan. 22, 1926    2 Sheets-Sheet 1
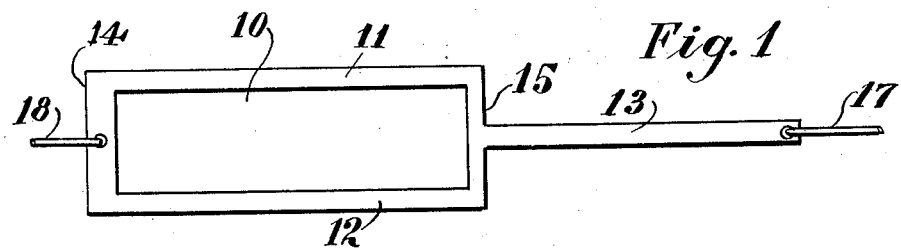
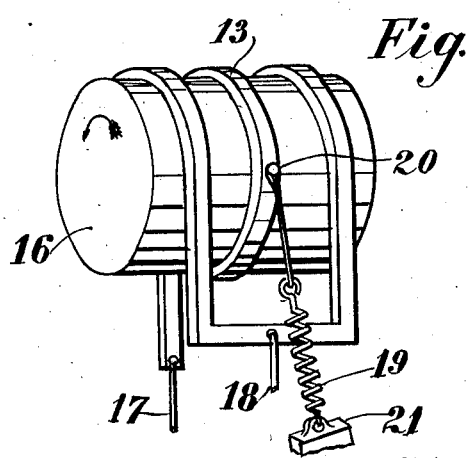
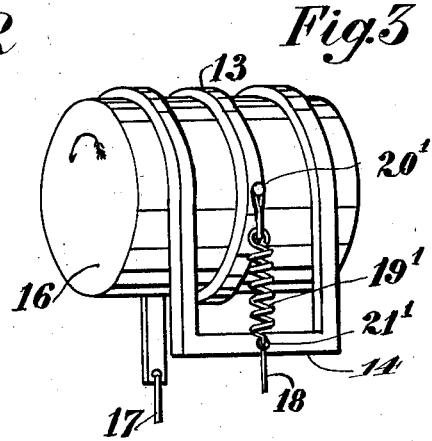
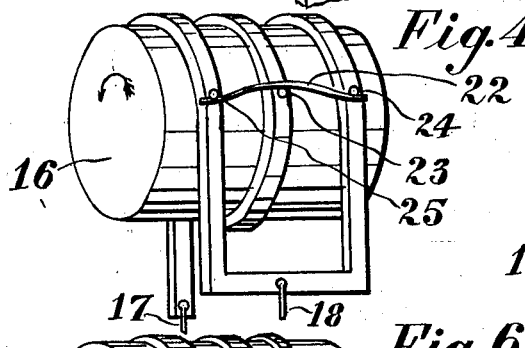
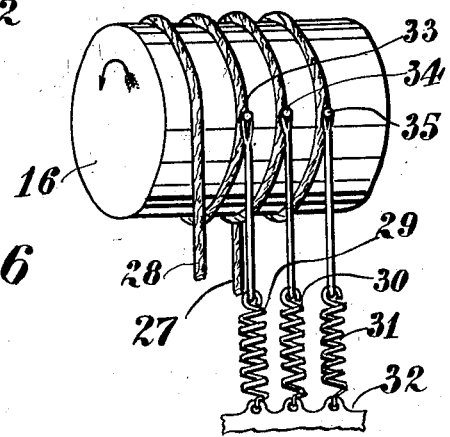
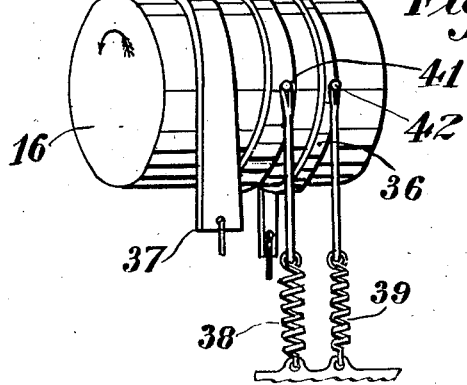
INVENTOR
Henry W. Nieman
BY R. S. A. Dougherty
ATTORNEY

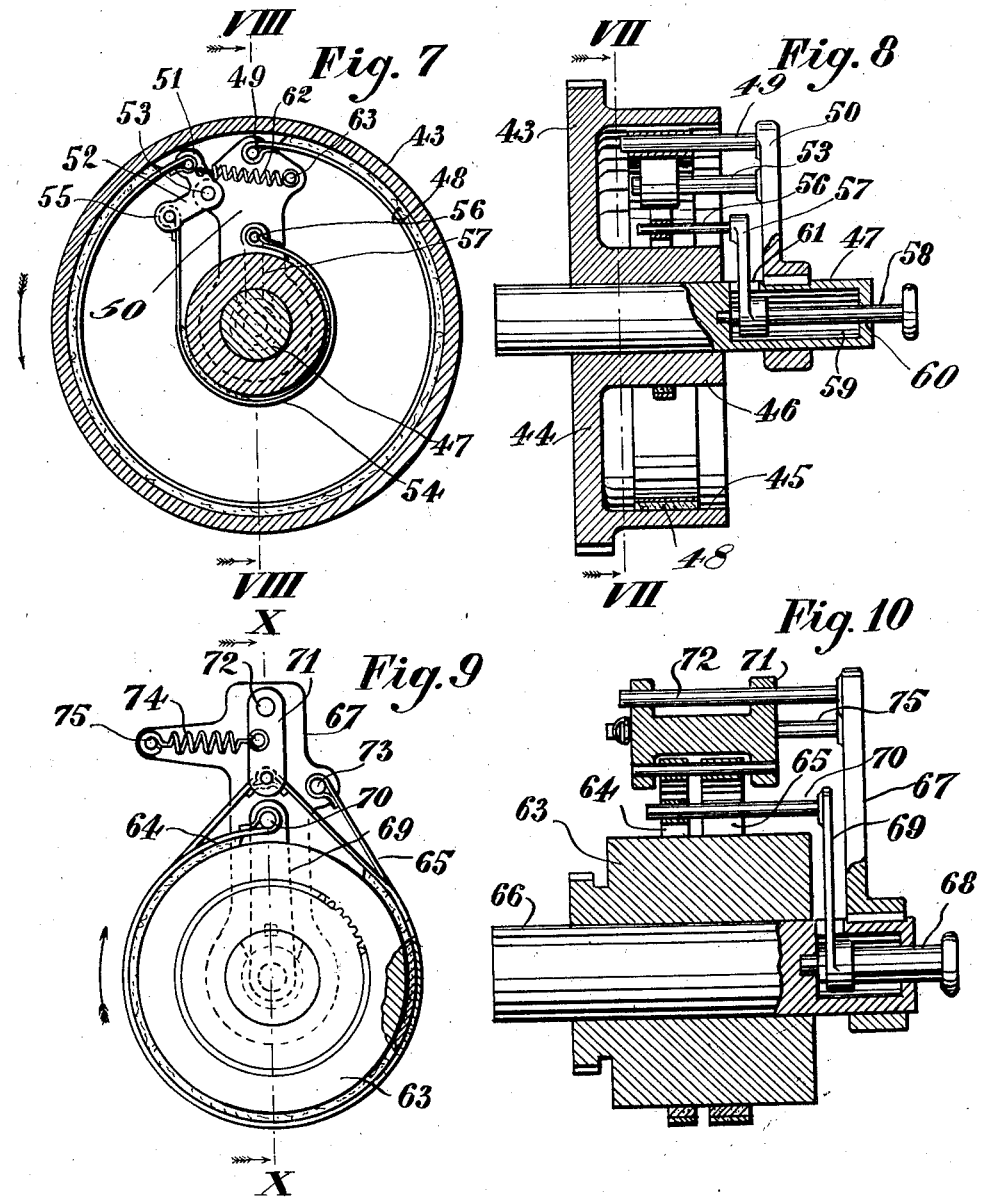

Patented Mar. 25, 1930

1,751,648

UNITED STATES PATENT OFFICE

HENRY WILLIAM NIEMAN, OF BETHLEHEM, PENNSYLVANIA

SERVO MECHANISM

Application filed January 22, 1926. Serial No. 83,095. Renewed May 29, 1929.

This invention relates to servo mechanisms of the wrapping friction type such as are, for instance, disclosed in my co-pending applications for Letters Patent of the United States, Serial Numbers 5,327 and 79,956, filed January 28, 1925 and January 8, 1926, respectively.

Servo mechanisms of the wrapping friction type such as disclosed and claimed in my co-pending applications comprise generally at least one drum member having a cylindrical friction face and a band or wrapping friction member adapted to engage such cylindrical friction face, the band and drum being mounted upon separate members which are relatively rotatable about a common axis. One end of the band is adapted to be moved by a control element and the other end of the band is connected to a work member. The servo mechanism may be of the retarding type or of the driving type and the wrapping friction member or band may be of the expanding or contracting type as desired, that is, it may be placed under compression or under tension in the operation of the servo mechanism.

In the ideal case, that is, with a perfectly flexible band member without weight, and where the factors tending to produce drag reactions, as hereinafter defined, are absent, the ratio between the control force and the work force is given by the following expression, $$\frac{1}{e^{\alpha f}},$$

where $e$ is the mathematical constant 2.718, $\alpha$ is the arc of contact between the band and the drum expressed in radians, and $f$ is the coefficient of friction. It follows from the above formula that in the ideal case if a force F be applied to the work end of the band there will exist a residual reaction in the band caused by the applied work force which at any point has the value $$\frac{F}{e^{\alpha f}},$$

where $\alpha$ is the arc of contact, commonly called the angle of wrap, expressed in radians, between the work end of the band and the assumed point.

I have discovered, however, in the design of such servo mechanisms that in addition to the available control force and required work force there are certain other factors which must be considered, such as weight, stiffness and initial distortion of the band, skin friction due to gummy or liquid materials on the bands or drums, electro-static conditions, centrifugal forces, any of which may act upon the band in such a way as to develop friction between it and the drum with which it cooperates, even in the absence of an applied control force. The friction so developed results in tangential forces in the band which, while wholly independent of the applied control force, act in the same direction as the control force. Such tangential forces are hereinafter collectively referred to as "drag" reactions. If in progressing from the work end of the band to the control end, a point exists where the residual of an applied work force is less than the cumulative drag reactions caused by the existance of drag factors on the control side of such point, then the band will grip the drum even in the absence of an applied control force. It is the primary object of this invention to provide means for and method of overcoming drag reactions to a sufficient degree to prevent the band from gripping the drum in the absence of an applied control force. I have found that this may be accomplished by imposing drag relief forces upon the band which tend to neutralize cumulative drag reactions at a point or points along the band where such cumulative drag reactions exceed the residual of the applied work force at such point. These drag relief forces are imposed upon the band by any suitable means, preferably springs, and I have found that they do not detract from the responsiveness of the servo mechanism, and I have further found that any loss in sensitivity may be compensated for by an increased length of band with or without the imposed forces in the added band portion as circumstances may dictate.

Another object of the invention is to provide means for and method of controlling a work force which varies between comparatively wide limits by a control force which varies between comparatively narrow limits. This is also accomplished by imposing extraneous tangential forces upon the band as heretofore described. For example, in a servo mechanism without such imposed forces having an angle of wrap of three turns and a coefficient of friction of .6, a work force of 80,000 pounds may be controlled theoretically by a force of approximately 1 pound. If the work force should be doubled, the necessary control force in the theoretic case would be 2 pounds and so on, in other words, in the theoretic case, the work and control forces vary proportionately. However, by imposing extraneous forces upon the band by springs or otherwise, it is possible to increase the force necessary to move the control end of the band when the work force is 80,000 pounds to, in a given case, say 100 pounds. If now the work force be doubled, the force required at the control end of the tape would not be 200 pounds but would be 101 pounds. In other words, the control force may be made to vary between comparatively narrow limits even though the work force varies between comparatively wide limits. It is furthermore possible, by increasing the length of arc contact, to reduce the control force in the case where the extraneous forces are imposed upon the band to 1 pound when the work force is 80,000 pounds. In such case, if the work force should be doubled, the control force would be of the order of 1.01 pounds. In other words, it is possible not only to obtain narrow limits in the variation of the control force but also possible, by increasing the length of arc contact, to compensate for any loss of sensitivity.

A further object of the invention is to provide means for and method of maintaining a reasonably constant control force irrespective of ordinary changes in the coefficient of friction which occur from time to time in service. For low ratios of amplification, for instance 3 to 1, a small percentage increase in the coefficient of friction causes an approximately equal percentage increase in the ratio of amplification, but for high ratios a small percentage increase in the coefficient causes a very large percentage increase in the ratio of amplification. Thus, three turns of a material with a friction coefficient of 0.60 will give a ratio of amplification of about 80,000 to 1; but if the friction rises to 0.65 this ratio will rise to 210,000 to 1. An increase of the coefficient of friction of about 8% here causes an increase of the ratio of about 160%. In the above no extraneous forces have been imposed upon the band.

The manner in which fluctuations in the control force, due to changes in the coefficient of friction, may be reduced by the imposition of extraneous tangential forces acting in opposition to the control force, will now be explained. Assume that a large number of turns are employed and at each turn a spring acting tangentially is placed. The control force will be resisted principally by the force of the first spring, spaced one turn away from it, this force being constant at its point of application but, when measured at the control end, reduced in inverse proportion to the ratio of amplification of this one turn. As pointed out above, this ratio will vary if the coefficient of friction varies, but since the ratio is small a change of the coefficient of friction by a small percentage will cause only a moderate change in the ratio, and therefore the control force to oppose this first spring will be reasonably constant. The control force must also be resisted by the force from the second spring, spaced two turns away from the control end; the force transmitted by this second spring will be very much smaller since the ratio of amplification between the control end and the second spring is very much greater, it being assumed, for the sake of explanation, that all the springs are of the same size. The same reasoning applies to the third and subsequent springs, with the result that a change of coefficient of friction causes only a moderate change of the control force.

In practice it is generally found to be desirable to employ a band which decreases in size and weight from the work end to the control end or a series of bands in stages cooperating with the same or different drums, lighter bands being used as the control end is approached. When it is desired to impose extraneous forces upon the band or bands to overcome drag reactions, these forces should be proportioned approximately to the drag reactions of the sections of bands which they govern. In cases where it is desired to impose extraneous forces to overcome the effect on the control force of a change in the value of the coefficient of friction, the points of application of these forces should be spaced rather closely and the forces should increase from the control to the work end of the band. Where it is desired to minimize the effect of changes in the work force, I have found it desirable to provide several turns of band, preferably of uniform size adjacent to the control end and to impose forces of equal intensity on each turn. However, it should be understood that in the general case the exact proportioning of the imposed forces and their proper points of application cannot as a rule be calculated but can be readily determined by experiment.

In the drawings, Fig. 1 illustrates a flexible friction band member;

Figs. 2, 3, 4, 5 and 6 illustrate diagrammatically various embodiments of my invention and particularly various arrangements of spring means for imposing extraneous forces upon the band;

Figs. 7 and 8 illustrate further embodiments of my invention and particularly spring means for imposing an extraneous force upon the band of a servo mechanism having two stages of amplification arranged in series, the outer band of which is adapted to operate under compression, while the inner band is adapted to operate under tension, Fig. 7 being a cross section taken on the line VII—VII in Fig. 8, and Fig. 8 being a cross section taken on the line VIII—VIII in Fig. 7; and Figs. 9 and 10 illustrate a further embodiment of my invention and particularly spring means for imposing an extraneous force upon the band of a servo mechanism having two stages of amplification in which each band stage operates under tension, Fig. 10 being a cross section taken on the line X—X in Fig. 9.

Referring now to the drawings, in Fig. 1 I show a flexible friction member 10 which comprises a plurality of thin bands, 11, 12 and 13 connected together by yokes 14 and 15. The bands and yokes are preferably made of metal but they may be made of any material suitable for the purpose. The member 16, Figs. 2 to 6, inclusive, is a power driven drum adapted to be driven in the directions indicated by the arrows and is mounted in bearings carried by suitable supports, not shown. The member 10 is adapted to be bent around a drum 16, see Fig. 2, so that it will encircle the drum about one and one-half times, the control portion 17 and the work portion 18 being parallel to each other. A spring 19 is attached to the band 13 by suitable means, as at 20, and the other end of said spring is attached to a fixed point, as at 21, on the support for the drum bearings. When the control end 17 is moved, the work end 18 will synchronously move a corresponding distance. The spring 19 exerts a tangential force on the member 10 sufficient to prevent the member 10 from gripping the drum 16. The tension of the spring 19 is fairly uniform since the member 10 moves through only a comparatively short distance.

In Fig. 3 I provide a spring 19' connected at one end to the band 13, as at 20', and having its other end attached to the yoke 14, as at 21'. By this arrangement, the tension of the spring 19' which relieves the drag reaction of the member 10 remains constant throughout the range of permissible movement of the control end of the band.

In Fig. 4 I provide a flat spring 22 which engages the band 13, as at 23, and extends in opposite directions and engages the bands 11 and 12, as at 24 and 25, respectively. The initial tension in the spring is sufficient to urge the band 13 in the opposite direction to the direction of rotation of the drum. Here again the arrangement is such that the tension of spring 22 remains constant throughout the intended range of movement of the control end of the member 10.

Fig. 5 shows a friction band 26 having control and work ends 27 and 28, respectively, and wound spirally around a drum 16. In this arrangement, springs 29, 30 and 31 of substantially equal strength are fixed at one end, as at 32, on the support for the drum bearings, and attached at their other ends to the coils at the points 33, 34 and 35, respectively. The springs exert equal tangential forces on each of the coils and counteract the drag reactions. The arrangement is further adapted to conditions where it is desired to have only slight variations in the control force for considerable variations in the work force.

Fig. 6 shows an arrangement similar to that shown in Fig. 5 except that the friction band 36 tapers throughout its length having its heaviest section at the work end 37. Springs 38 and 39 are attached to friction band 36 at the points 41 and 42 and at their opposite extremities fixed on the supports for the drum bearings. Here the springs differ in strength, their strengths being preferably proportional to the cross sections of the band 36 at their respective points of attachment. Such an arrangement would be suitable in cases where it is desired to minimize the effect on the control force of a change in the value of the coefficient of friction.

It will be apparent that suitable weights may be substituted for the springs in the devices shown in Figs. 2, 5 and 6.

Figs. 7 and 8 show a two stage friction amplifying device in which 43 indicates a drum adapted to be continuously rotated by suitable means in the direction indicated by the arrow. The drum has an open annular recess formed therein to provide an interior cylindrical surface 45 and a cylindrical hub 46 which projects from the rear wall 44 coaxially with the surface 45. The hub 46 is preferably an integral part of the drum 43 and is bored axially to receive the work shaft 47. An internal friction band 48 is placed contiguous with the interior surface 45 and is attached at one end to a pin 49 extending laterally from the work arm 50 which in turn is keyed to the shaft 47. The other end of the band 48 is attached to the arm 51 of the bell crank lever 52 which is pivotally mounted on the pin 53 also extending laterally from the work arm 50. A control friction band 54 is wrapped around the hub 46 and one end of said band is attached to the arm 55 of the lever 52 and the other end of the band is attached to the pin 56 which extends laterally from the control arm 57, which, in turn, is fixedly mounted on the control shaft 58. The latter is rotatably mounted in the socket 59 formed axially in the work shaft 47, and extends beyond said work shaft through the opening 60. An elongated opening 61 is provided in the wall of the socket 59 to allow the control arm 57 to project outwardly from the socket to the exterior of the shaft 47 and is of sufficient width to allow a limited relative angular movement between the work and control shafts. A coil tension spring 62 is attached to the arm 51 and is fixed at its other end to a pin 63 projecting laterally from the work arm 50. The spring 62 applies a force to the end of the band 48 which is opposite to the rotation of the drum 43 and is designed to overcome the drag reaction of band 54. As the spring 62 is affixed to the work arm 50 it is under substantially constant tension regardless of the angular position of the work arm. Movement of the control arm 57 in a counter-clockwise direction will tighten the band 54 on the hub 46 and the friction thus created will exert a powerful pull on the arm 55 of the lever 52, cause the latter to rock and press the band 48 firmly in contact with the surface 45, with the result that the band 48 will rotate with the drum 43 and effect the movement of the work arm 50 to rotate the work shaft 47.

Referring now to Figs. 9 and 10, I show a type of two stage servo mechanism having two friction bands which cooperate with a single power cylinder. In this latter arrangement, 63 indicates a drum having wrapped around it a light or control friction band 64 and a heavy or work friction band 65. The drum 63 is bored axially to receive the work shaft 66 which is provided with a radially extending work arm 67. A control shaft 68 is provided and is mounted within the work shaft 66 in the manner heretofore described in the description of Figs. 7 and 8. The control shaft is provided with a radially-projecting control arm 69. The control friction band 64 is attached at one of its ends to a pin 70 which extends laterally from the control arm 69 and is fastened at its opposite end to the swinging member 71 which is pivoted on the pin 72 that projects laterally from the work arm 67. The work friction band 65 is attached at one of its ends to the member 71 and at its opposite end to a pin 73 that projects laterally from the work arm 67. A tension spring 74 is fixed at one end to a pin 75 projecting from the work arm 67, connected at its other end to the swinging member 71, and operates to relieve the drag reaction of the light band on the surface of the drum 63. Means are provided to rotate the latter continuously in the direction indicated by the arrow. When the control arm 69 is moved in a clockwise direction, it tightens the friction band 64 on the drum 63 and due to the rotation of the latter causes the member 71 to swing and tightens the work friction band 65 which in turn causes the work arm to move a distance corresponding to the movement of the control arm.

It will be understood that while I have shown in the various embodiments of my invention a wrapping friction made up of a continuous band, it is nevertheless manifest that instead of such continuous band an articulated member comprising a plurality of shoes or the like may equally well be employed.

Having thus described the invention what is claimed as new and desired to be secured by Letters Patent is:

1. In a wrapping friction servo mechanism the combination of a wrapping friction member, a drum member, said members being relatively movable and arranged to friction against each other along a common surface whenever such relative movement occurs, means for applying a control force to the wrapping friction member, means for applying a work force to the wrapping friction member, and means for imposing an extraneous force on the wrapping friction member intermediate the points of application of the control force and the work force, said extraneous force being substantially tangent to the wrapping friction member and opposed to said control force.

2. In a wrapping friction servo mechanism the combination of a plurality of stages of amplification arranged in series, each stage comprising a wrapping friction member, and a drum member, said members being relatively movable and adapted to friction against each other along common surfaces, means for applying a control force to the wrapping friction member of the stage at one end of the series, means for applying a work force to the wrapping friction member of the stage at the other end of the series, and means for imposing an extraneous force on the wrapping friction members intermediate the points of application of the control force and the work force, said extraneous force being tangent to the wrapping friction member and opposed to said control force.

3. In a wrapping friction servo mechanism the combination of a wrapping friction member, a drum member, said members being relatively movable and the wrapping friction member being constantly in contact with the drum member, means for applying a control force to the wrapping friction member, means for applying a work force to the wrapping friction member, and spring means for imposing an extraneous force on the wrapping friction member intermediate the points of application of the control force and the work force, said extraneous force being tangent to the wrapping friction member and opposed to said control force.

4. In a wrapping friction servo mechanism the combination of a plurality of stages of amplification arranged in series, each stage comprising a wrapping friction member, and a drum member, said members being relatively movable and adapted to friction against each other along common surfaces, means for applying a control force to the wrapping friction member of the stage at one end of the series, means for applying a work force to the wrapping friction member of the stage at the other end of the series, and spring means for imposing an extraneous force on the wrapping friction member intermediate the points of application of the control force and the work force, said extraneous force being tangent to the wrapping friction member and opposed to said control force.

5. In a device of the class described, in combination, a wrapping friction member, a second member having a cylindrical friction face along which the wrapping friction member is disposed and with which it is in constant contact, said members being relatively movable, means for applying a control force to the wrapping friction member, separate means for applying a work force thereto, and means for imposing an extraneous force on the wrapping friction member intermediate the points of application of the control force and the work force, said extraneous force being substantially tangent to the wrapping friction member and opposed to said control force.

6. The combination set forth in claim 5 in which the wrapping friction member comprises two sections connected in series, each of which engages a friction surface of said second member.

7. The combination set forth in claim 5 in which the wrapping friction member comprises two radially spaced concentric sections connected in series by a lever, and said second member has radially spaced concentric surfaces which are engaged, respectively, by said sections.

8. The combination set forth in claim 5 in which the means for applying the extraneous force comprises a tension spring which connects said wrapping friction member and the means for applying a work force to the wrapping friction member.

9. In a device of the class described, in combination, a rotatable drum having two concentric cylindrical friction faces, a wrapping friction member formed in two sections which sections are in contact respectively with the cylindrical friction faces, a work member, a control element, a lever pivotally supported on the work member and connected to the work end of one band section and the control end of the other, and a spring connecting said lever to the work member whereby an extraneous force may be imposed on the wrapping friction member intermediate its ends, said extraneous force being tangent to the wrapping friction member and opposed to any control force which may be exerted thereon.

10. The combination set forth in claim 9 in which the friction faces are radially spaced, together with the corresponding band sections.

11. The combination set forth in claim 9 in which the connecting lever is a bell crank lever and the spring is a tension spring one end of which is secured to said bell crank lever adjacent to the point of attachment of the second band section of the wrapping friction member, and the other end is connected to the work member.

12. In a device of the class described, in combination, a rotatable member adapted to be power driven and having a cylindrical friction face, a wrapping friction member in constant contact with said friction face and having a control end and a power delivery end, and means for neutralizing the drag reactions which normally develop between the friction face and the wrapping friction member, to prevent the wrapping friction member from gripping the friction face in the absence of an applied control force.

13. In a sensitive control device, in combination, a member having a cylindrical friction face, a wrapping friction member in constant contact with said friction face, said members being relatively rotatable, and the wrapping friction member having a control end and a power delivery end, and means for neutralizing the drag reactions which normally develop between the friction face and the wrapping friction member, to prevent the wrapping friction member from gripping the friction face in the absence of an applied control force.

In testimony whereof I hereunto affix my signature this 22nd day of January, 1926.

HENRY WILLIAM NIEMAN